United States Patent [19]
Thomas

[11] 4,429,644
[45] Feb. 7, 1984

[54] FLUIDIZED BED FIRING SYSTEM

[75] Inventor: Lothar Thomas, Krefeld, Fed. Rep. of Germany

[73] Assignee: Deutsche Babcock Anlagen Aktiengesellschaft, Oberhausen, Fed. Rep. of Germany

[21] Appl. No.: 341,603

[22] Filed: Jan. 22, 1982

[30] Foreign Application Priority Data

Apr. 21, 1981 [DE] Fed. Rep. of Germany ....... 3115843

[51] Int. Cl.³ .............................................. F23G 5/00
[52] U.S. Cl. .................................... 110/245; 122/4 D
[58] Field of Search .............. 110/243, 244, 245, 347; 122/4 D

[56] References Cited

U.S. PATENT DOCUMENTS

| | | | |
|---|---|---|---|
| 4,287,838 | 9/1981 | Frosch | 110/245 |
| 4,309,948 | 1/1982 | Zielinski | 110/245 |
| 4,312,302 | 1/1982 | Kollerup | 122/4 D |
| 4,336,227 | 6/1982 | Koyama et al. | 110/245 |
| 4,356,779 | 11/1982 | Porter et al. | 110/245 |
| 4,357,883 | 11/1982 | Comparato et al. | 110/245 |
| 4,363,292 | 12/1982 | Engstrom | 110/245 |
| 4,377,119 | 3/1983 | Noack | 110/245 |

FOREIGN PATENT DOCUMENTS 1084977 9/1967 United Kingdom ............... 110/245

Primary Examiner—Henry C. Yuen
Attorney, Agent, or Firm—Max Fogiel

[57] ABSTRACT

A bottom of a combustion chamber of a fluidized bed firing system is penetrated by coal nozzles for introducing a coal/air mixture, and by air nozzles for injecting combustion air into the fluidized bed. A plate provided with openings is arranged in spaced relationship above each coal nozzle for achieving an improved burn-up.

11 Claims, 2 Drawing Figures

FLUIDIZED BED FIRING SYSTEM

BACKGROUND OF THE INVENTION

The present invention relates to a fluidized bed firing system with a combustion chamber having a bottom which is penetrated by coal nozzles for introducing a coal/air mixture and by air nozzles for injecting combustion air into the fluidized bed.

By applying special nozzle forms for such fluidized bed firing systems, the attempt is made to distribute the fuel as uniformly as possible in the fluidized bed. The granular fuel thus admitted shall intimately mix with the bed material immediately after having entered into the fluidized bed. Strong mixing is promoted by the rising of bubbles within the fluidized bed.

When the fuel admitted through the coal nozzles, consists of a grain fraction with an increased amount of fine particles and when it is pneumatically introduced into the fluidized bed, the small particles will be entrained by the main gas stream in the main flow direction. In the region of the bubbles, this main flow direction of the solids is given by the bubble rising direction. The bubbles have consequently the twofold disadvantage: in their border zone and in their cloud they transport unburnt fuel particles through the fluidized bed into the freeboard above the fluidized bed; in their border zone they have, moreover, a poorer exchange of matter than within the homogeneous area of the fluidized bed.

SUMMARY OF THE INVENTION

The present invention pursues the object of subjecting a fluidized bed firing system of the initially described kind, to further development with a view to avoiding the disadvantages inherent in the formation of bubbles and to achieving a good burn-up of the fuel.

According to the present invention, this object is attained by arranging an aperture plate within the fluidized bed in spaced relationship above each coal nozzle.

By rerouting the medium flow, the plates destroy the bubbles which form in the lower portion of the fluidized bed, rise and permanently enlarge. As a result, the fine particles will no longer be discharged from the fluidized bed in the unburnt condition, but will be forced to stay longer in the fluidized bed.

The novel features which are considered as characteristic for the invention are set forth in particular in the appended claims. The invention itself, however, both as to its construction and its method of operation, together with additional objects and advantages thereof will be best understood from the following description of specific embodiment when read in connection with the accompanying drawing.

BRIEF DESCRIPTION OF THE DRAWINGS

FIG. 3 is a longitudinal section of another embodiment of Fig. 1.

DESCRIPTION OF THE PREFERRED EMBODIMENTS

Figure 1:
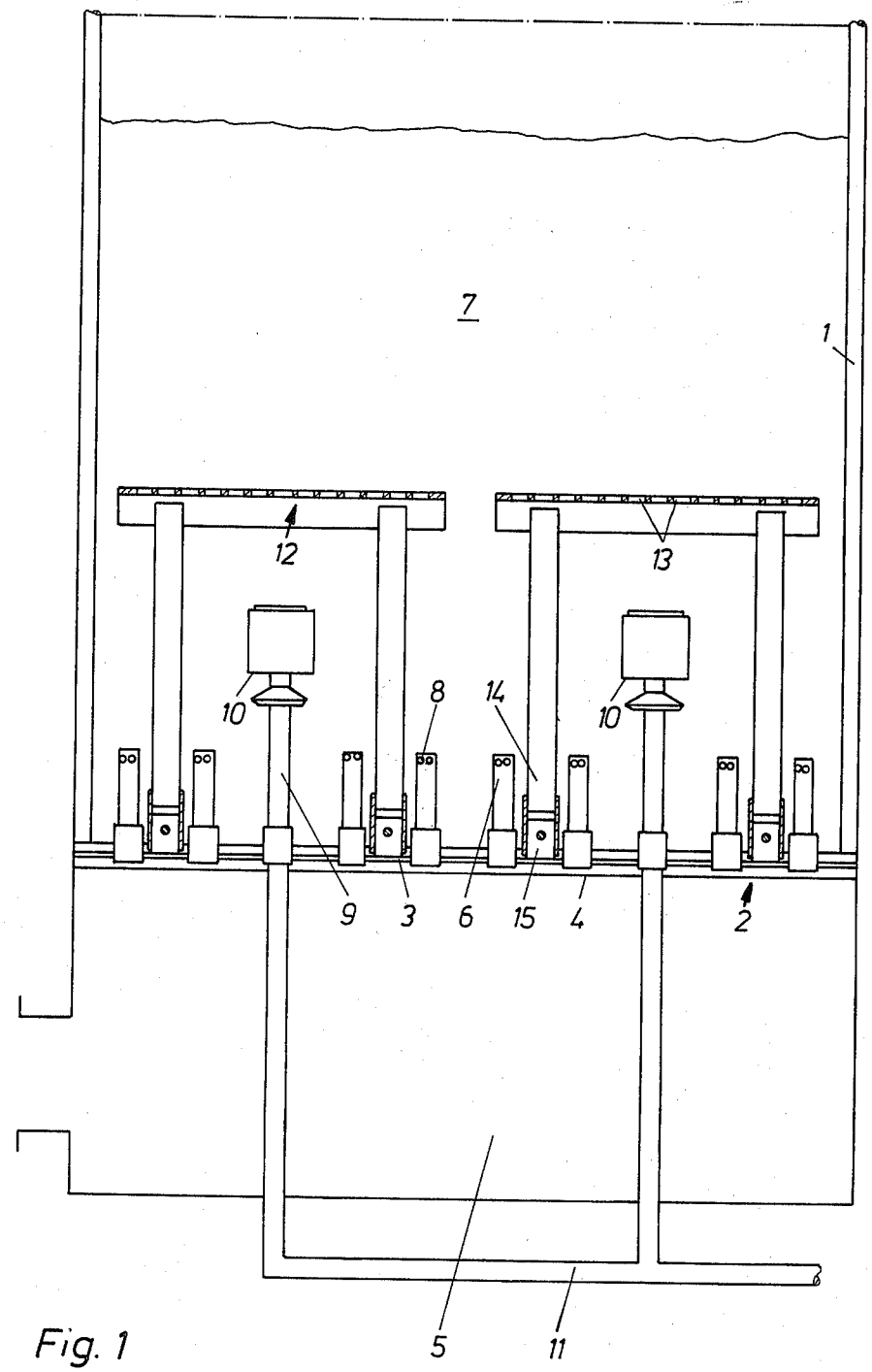
FIG. 1 is a longitudinal section through a fluidized bed combustion chamber, in accordance with the present invention.

The combustion chamber for a fluidized bed firing system is defined by side walls 1 and bottom 2, consisting of cooled tubes 4 interconnected by webs 3. Underneath the bottom 2 there is a wind box 5 communicating with air nozzles 6. The air nozzles 6 extend through the bottom 2 and project into the fluidized bed 7.

At their top the air nozzles 6 are provided with lateral outlet orifices 8. Combustion air, which simultaneously serves as a fluidization medium, is blown into the fluidized bed 7 through these air nozzles 6.

Furthermore, individual coal nozzles 9, through which the coal is blown into the fluidized bed 7 by means of a carrier air stream, extend through bottom 2 of the combustion chamber.

The coal nozzles 9 extend through the wind box 5 and are connected to a supply line 11. The coal nozzle 9 shown in FIG. 1 has an axial, annual outlet cross-section 10 through which the coal/air mixture exits downwardly. But the coal nozzles 9 may also have the form of a tee, such as shown in FIG. 2. From this coal nozzle 9 the coal/air mixture exits laterally through the two horizontal legs 16.

The combustion chamber is followed by a gas pass (not shown) in which the back-end heating surfaces are arranged. Further heating surfaces may be located within the combustion chamber as freeboard heating surfaces above the fluidized bed 7 or as immersion type heating surfaces 17 within the fluidized bed 7. The immersion type heating surfaces 17 consist of a tube bank, the tubes of which are connected to headers 18 situated outside of the combustion chamber.

Plate 12 provided with openings 13 is arranged within the fluidized bed 7 in a spaced relationship above each coal nozzle 9. The plate 12 may be plane and parallel to bottom 2. But vaulted plates may be used just as well. As will be noted in the drawing, the plate 12 consists of a perforated member. But also other geometric forms may be chosen, such as gratings which are designed, e.g., as cross gratings or they may be formed by circular segments.

Figure 2:
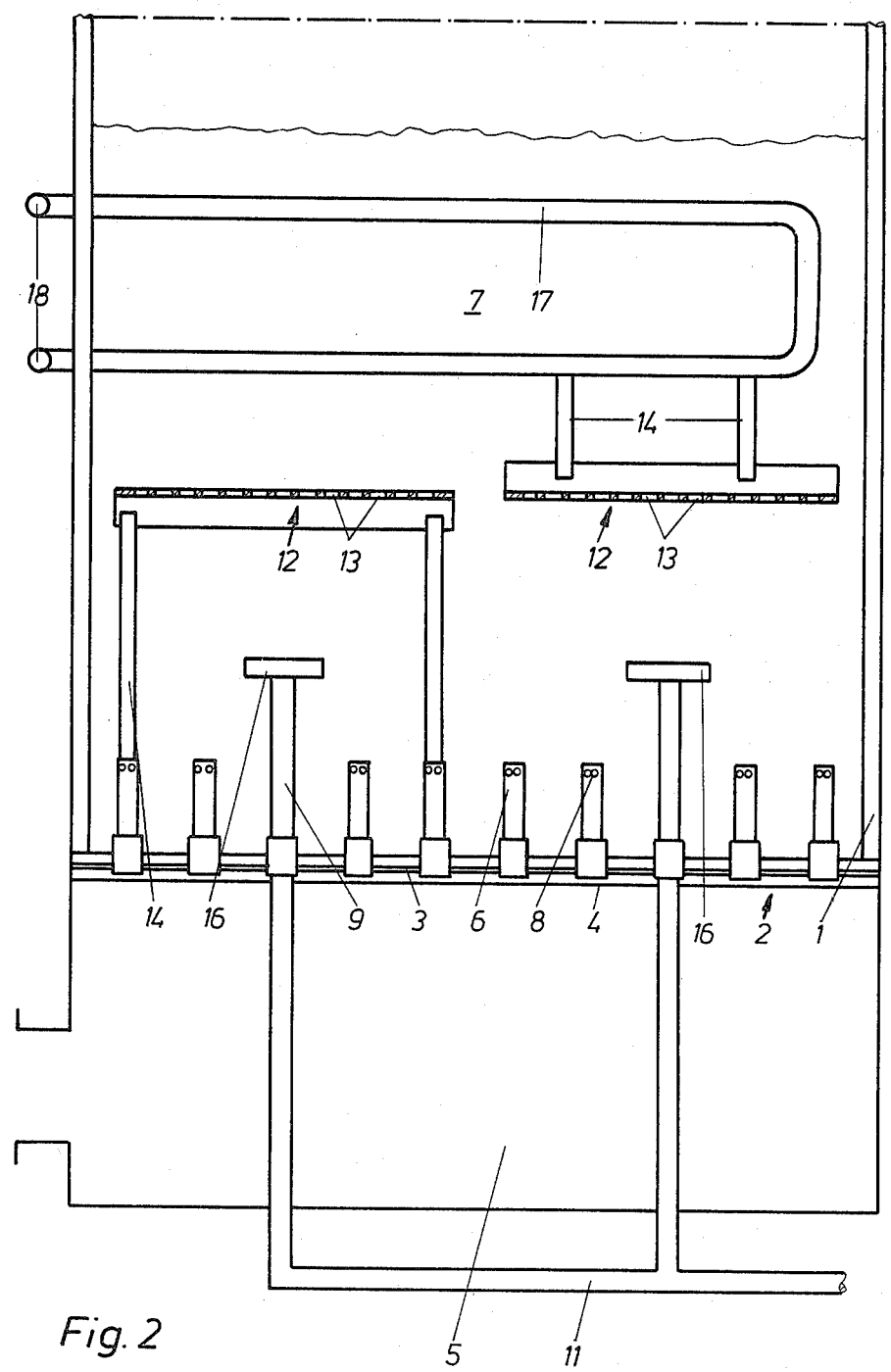
FIG. 2 is a longitudinal section through another embodiment of a fluidized bed combustion chamber.

According to FIG. 1, the plates 12 are attached to support tubes 14 which rest on the bottom 2. To this end, flanges 15, to which the support tubes 14 are screwed, are welded to the webs 3 of bottom 2.

FIG. 2 shows two further options for supporting the plates 12. The support tubes 14 carrying the plate 12 represented on the left hand side rest on the air nozzles 6 closed at top. In a similar manner the support tubes 14 may be placed onto the coal nozzles 9. The plate 12 may also be suspended from the immersion type heating surfaces 17 by means of the support tubes 14.

The supporting tubes 14, as shown, are uncooled. But they may also be provided with cooling. Air may be used as a coolant. In this case the support tubes 14 will be connected to the wind box 5. The air flowing through the support tubes 14 will exit into the fluidized bed 7. Another cooling mode may be achieved by connecting the support tubes 14 to the coolant circuit of the immersion type heating surfaces 14 or of the tubes 4 of bottom 2.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. Fluidized bed firing system comprising: a combustion chamber having a bottom; coal nozzles penetrating said bottom for introducing a coal/air mixture; air nozzles penetrating said bottom for injecting combustion air into the fluidized bed; a plate having openings and arranged within the fluidized bed in spaced relationship above each coal nozzle, said plates deflecting gas flow for destroying bubbles forming in the bottom of said fluidized bed and continuously enlarging after rising, so that fine particles are prevented from leaving the fluidized bed with the bubbles in unburnt condition and are held substantially long in said fluidized bed, said plate covering only a respective coal nozzle and air nozzle located in close adjacent vicinity, said plates being spaced from each other, the number of plates corresponding to the number of coal nozzles.

2. Fluidized bed firing system according to claim 1, wherein said plate is supported on said bottom.

3. Fluidized bed firing system according to claim 1, including immersion type heating surfaces arranged within the fluidized bed; said plate being attached to said immersion type heating surfaces.

4. Fluidized bed firing system according to claim 1, wherein said plate is supported on said coal nozzles.

5. Fluidized bed firing system according to claim 1, including cooled support tubes for attachment of said plate.

6. Fluidized bed firing system according to claim 5, wherein said support tubes are connected to a coolant circuit of the combustion chamber bottom.

7. Fluidized bed firing system according to claim 5, wherein said support tubes are connected to a coolant circuit of said immersion type heating surfaces.

8. Fluidized bed firing system according to claim 1, wherein said plate comprises a perforated member.

9. Fluidized bed firing system according to claim 1, wherein said plate comprises a grating.

10. Fluidized bed firing system according to claim 1, wherein said plate is supported on said air nozzles.

11. A fluidized bed firing system according to claim 1, and said plate being supported on said bottom; immersion type heating surfaces arranged wihin said fluidized bed; said plate being attached to said immersion type heating surfaces; cooled support tubes for attachment to said plate; said support tubes being connected to a coolant circuit of the combustion chamber bottom; said plate comprising a perforated member.

* * * * *